United States Patent [19]
Von Haas et al.

[11] Patent Number: 5,743,680
[45] Date of Patent: Apr. 28, 1998

[54] METAL REMOVING TOOL, IN PARTICULAR LANCING INSERT

[75] Inventors: Rainer Von Haas, Geesthacht; Willi Jester, Herten, both of Germany

[73] Assignee: Widia GmbH, Essen, Germany

[21] Appl. No.: 753,169

[22] Filed: Nov. 20, 1996

Related U.S. Application Data

[63] Continuation of Ser. No. 411,725, filed as PCT/DE93/00900 Sep. 20, 1993, published as WO94/09933 May 11, 1994, abandoned.

[30] Foreign Application Priority Data

Oct. 28, 1992 [DE] Germany ............ 42 36 370.5

[51] Int. Cl.$^6$ ........................... B23P 15/44
[52] U.S. Cl. .................. 407/19; 407/110; 407/117
[58] Field of Search .................. 407/109, 19, 110, 407/117

[56] References Cited

U.S. PATENT DOCUMENTS

| | | |
|---|---|---|
| 3,844,008 | 10/1974 | Sletten . |
| 5,035,545 | 7/1991 | Zinner .......................... 407/110 |

FOREIGN PATENT DOCUMENTS

| | | |
|---|---|---|
| 0 152 729 B1 | 8/1985 | European Pat. Off. . |
| 0 242 343 A1 | 10/1987 | European Pat. Off. . |
| 0 312 223 A1 | 4/1989 | European Pat. Off. . |
| 0 491 669 A2 | 6/1992 | European Pat. Off. . |
| 22 06 654 | 9/1972 | Germany . |
| 22 59 216 C3 | 9/1973 | Germany . |
| 2 411 759 | 3/1974 | Germany . |
| 30 44 790 A1 | 6/1981 | Germany . |
| 3906822 | 9/1990 | Germany . |
| WO 89/10224 | 11/1989 | WIPO . |

*Primary Examiner*—Daniel W. Howell
*Assistant Examiner*—Mark Williams
*Attorney, Agent, or Firm*—Herbert Dubno

[57] ABSTRACT

A metal removing tool, in particular lancing insert, has a holder (10) with a slot-shaped recess (11) and a cutting insert (12) detachably held therein under a prestress by means of an elastically expandable clamping arm (101) designed as one side of the recess (11). The opposite cooperating insertion and bearing surfaces of the cutting insert (12) and slot-shaped recess (11) have a V-shaped cross-section. At its insertion and bearing surface facing the clamping arm (101), the cutting insert has a plurality of substantially flat partial surfaces (124, 125, 126) arranged behind each other in the insertion direction. Two surfaces enclose an obtuse angle α and form a salient point at the ridge (127), so that the clamping arm (101) engages the cutting insert (12) between the ridge (127) and the cutting edge (121) in the clamping state. In particular to prevent the cutting insert from being drawn out of its seat, the partial surface (124) engaged by the clamping arm (101) is inclined so as to form a negative angle β with respect to the bearing surface (128) or the plane defined by the bearing lines of the cutting insert.

10 Claims, 6 Drawing Sheets

METAL REMOVING TOOL, IN PARTICULAR LANCING INSERT

CROSS REFERENCE TO RELATED APPLICATIONS

This application is a continuation of application Ser. No. 08/411,725 filed 31 Mar. 1995 (now abandoned). Application Ser. No. 08/411,725 is a national phase application filed under 35 USC 371 of the International Application PCT/DE93/00900 filed 20 Sep. 1993 published as WO94/09933 May 11, 1994 and based upon German National Application P 42 36 370.5 of 28 Oct. 1992 under the International Convention.

FIELD OF THE INVENTION

The invention relates to a metal (chip) removing tool, particularly a lancing insert.

BACKGROUND OF THE INVENTION

In DE-OS 22 06 654 a lance holder is described and has an elastically bendable clamping arm whose free end presses the cutting insert against the holder under the effect of its bending stress. For a better adjustment of the clamping force and in order to prevent the cutting edge from being pushed out of the slot-shaped recess, the EP 0 095 062 B2 proposes a lancing tool wherein the cutting insert and the upper clamping jaw are provided with an insertion-limiting stopping element in such a manner that the cutting pressure leads to a proportional increase of the clamping stress. The clamping slot has a recess extending rearward from the stopping element and which, deviating from the longitudinal direction of the clamping slot, extends into the upper clamping jaw, so that for its expansion a visibly narrow-defined bridge, acting as a linking point, is formed. The clamping surface of the upper clamping jaw rises slightly inwardly with respect to the clamping surface of the cutting insert, so that generally a lever-like clamping of the cutting insert into the clamping jaws should result.

The DE 39 06 822 A1 describes a further development of the aforedescribed embodiment in which the clamping slot has at its rear end an oval slot area, into which an expansion key with an ellipsoidal cross section can be inserted and turned, whereby the clamping arm is expanded and the lancing or cutting insert can be released.

The cutting insert according to EP 0 152 729 B1 has a cutting insert with an edge surface which opposite to the bearing surface has a plurality of mutually inclined parts which are meant to serve as gliding surfaces during the insertion of the cutting insert, whereby the start of the end phase of insertion is defined by a salient or arresting point between two parts of the edge surface which are at an obtuse angle to each other. The surface of the clamping contact lies in the mutual end position of the clamping arm and the cutting insert between the salient and arresting point and the cutting edge of the cutting insert. The cooperating surfaces of the cutting insert, as well as the corresponding surfaces of the holder are V-shaped. The two partial surfaces forming a salient and arresting point, or a ridge, so designed so that the clamping surface lies approximately parallel to the contact surface of the cutting insert and the thereon bordering surface is inclined at a positive angle between 2° and 5°.

A corresponding design with a stopping nose for a frontal side of the clamping arm is shown the EP 0 242 343. The clamping surface of the cutting insert bordering on the stopping nose is parallel to its contact surface. The mentioned clamping surface is succeeded by a flat surface at a positive angle. Seen in cross section the respective bearing surfaces of the cutting insert and the slot-shaped recess are here also V-shaped.

OBJECT OF THE INVENTION

It is the object of the present invention to further develop the chip-removing tool mentioned in the introduction, so that the cutting insert is protected against being pulled out, especially when the tool is retracted from a groove.

SUMMARY OF THE INVENTION

The tool of the invention has a holder with a slot-shaped recess and a cutting insert detachably held therein under preliminary stress by means of an elastically expandable clamping arm designed as one side of the recess. The cutting insert and the slot-shaped recess each have, considered in cross section, a V-shaped configuration at their mutually cooperating insertion and bearing surfaces. The cutting insert has at its insertion and bearing surface facing the clamping arm a plurality of basically flat partial surfaces arranged in succession in the direction of insertion, two of which are at an obtuse angle to each other and form a salient point at the ridge. Thus in the clamped state the clamping arm engages the cutting insert between the ridge and the cutting edge the partial surface wherein the clamping arm engages is inclined at a negative angle with respect to the contact surface or plane defined by the contact lines of the cutting insert. When compared to the cutting insert known in the art, this inclination in connection with the clamping arm leads to the fact that the cutting insert, even when subjected to traction, cannot be pulled out of its clamped position or be inadvertently displaced. The rearwardly acting component, i.e. the component acting in the insertion direction, determined by the clamping force, is defined in dependence of the inclination angle, which ranges preferably between 2° and 30°, whereby the larger part of the clamping force presses the cutting insert in its contact position in the holder. Advantageously this embodiment can be combined with all configuration features known to the state of the art wherein rearward stopping elements are provided in the holder recess, in order to prevent a rearward displacement of the cutting insert during the chip-removal operation. A lateral displacement of the cutting inserts is effectively prevented at the cutting insert and the holder by the surfaces having each a V-shaped cross section.

The clamping arm can lie against the cutting insert preferably between the ridge and the cutting edge, in intermittent or continuous contact (whereby the contact line is transverse to the insertion direction). This intermittent or continuous contact insures—even when there are possible machining imprecisions in the surface at the cutting insert and the holder recess—a stable arrest.

According to a further embodiment the clamping arm has in its frontal area a flat bearing surface, which in the clamping position rises slightly inwardly with respect to the corresponding opposite partial surface of the cutting insert. The angle of ascent ranges between 1° and 10°, preferably 1° to 5°.

The contact surface of the cutting insert and the corresponding receiving location in the holder can be concavely curved as a hollow bottom for a further stability increase.

The previously described embodiment offers in connection with the hollow-bottom design a multipoint contact in the area of the receiving location, or of the cutting insert bottom with respect to a one-sided point or linear pressure in the cutting insert surface. If further stabilization is desired, the clamping arm can have a further point of application or a further line or surface of application at one of the partial surfaces which is as remote as possible from the cutting edge, i.e. the cutting insert is clamped from above in the frontal area behind the cutting edge and in the extreme rear area of the cutting edge.

Preferably the cutting insert has three successive partial surfaces arranged in insertion direction and having a V-shaped cross section, the last of which is removed as far as possible from the cutting edge and is parallel to the cutting-edge contact surface.

As long as the contact surface is hollow the plane defined by the contact line is to be considered in a corresponding manner. The middle partial surface is preferably inclined at a positive angle of 5° to 70° with respect to the contact surface, which during the insertion of the cutting insert in the slot-shaped recess has the effect that the inclined second surface represents a kind of ramp with respect to the frontal side of the clamping arm, causing the clamping arm to expand when the cutting insert is pushed in, in order to pull the clamping insert rearward into the receiving element, after the passage of the ridge.

The extreme rear contact surface, which is optionally also further engaged, is either parallel to the underside of the cutting insert, or the seat in the holder, or is inclined at a positive angle of 1° to 10°, preferably 1° to 5° with respect to the contact surface of the cutting insert. In the case of an inclined design the transition from the first partial surface to the second partial surface is built as a ridge and from the second partial surface to the third partial surface it is built as a depression. However the second and third partial surface can also be designed as a single surface.

As a rule the partial surfaces are flat, but they can also be slightly concavely or convexly curved. If the clamping arms presses in the frontal area as well as in the rear area, then the clamping arm has advantageously a recess between the frontal partial surface and the rear bearing surface, which is round in a preferred embodiment. This recess "bridges over" the second partial surface of the cutting insert including the ridge.

If the cutting insert is designed to have a larger height then the slot-shaped recess not subject to load, then in the clamped state of the cutting insert a prestressing effect results.

According to a further embodiment the cutting insert has a stopping element in the area adjacent to the cutting edge, which determines the end position of the cutting insert in the holder due to contact pressure of the holder clamping arm against a frontal surface.

The clamping arm is a choice location for a cooling-medium channel.

In order to facilitate the release of the cutting insert from the clamping action for replacement or when the work process is finished, the slot-shaped recess has in an area close to the spot where the cutting insert is received, a contoured recess into which a socket wrench having a cross section whose length exceeds its width can be inserted and turned, thereby expanding the slot-shaped recess in the area where the cutting insert is received. Preferably the contoured recess and the socket wrench have an oval or ellipsoidal cross section, which facilitates the turning of the socket wrench.

According to a further embodiment of the invention, the prestressing of the clamping arm can be adjusted through a clamping screw, an embodiment which is particularly suitable for longitudinal turning.

BRIEF DESCRIPTION OF THE DRAWING

The above and other objects, features, and advantages will become more readily apparent from the following description, reference being made to the accompanying drawing in which.

SPECIFIC DESCRIPTION

Figure 10:
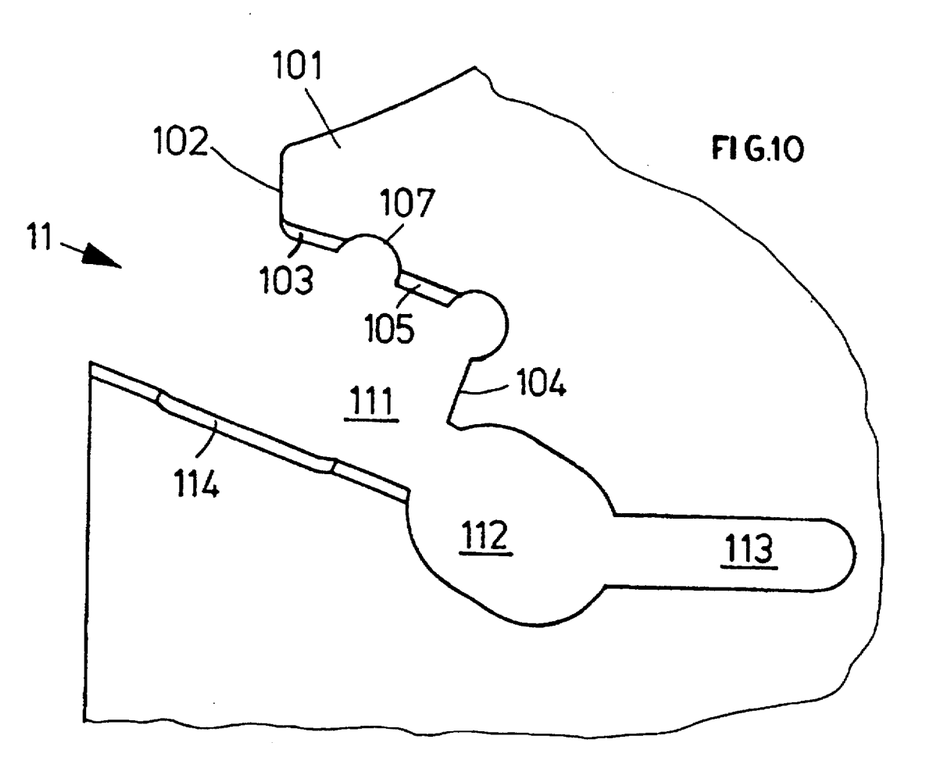
FIG. 10 is the pertaining lancing tool holder.

Each of the represented holders 10 has a slot-shaped recess 11 (see particularly FIG. 10), whose first part 111 is fitted to the outer contour of the cutting insert 12. In the extreme extension of the recess 11 an elongated oval to ellipsoidal hollow space 112 is provided, into which a socket wrench 13 (see FIG. 7) can be inserted with its insertion end 131. Through a 90° rotation the clamping arm 101 can be moved by the expansion of the slot 11.

The further extension 113 of the slot which follows immediately after the oval recess 112 basically determines the length of the clamping arm 101 and thereby also the magnitude of the preliminary stress which can be afforded by means of the clamping arm.

The cutting insert 12 has at its frontal end a cutting edge 121, as well as chip-removing geometries in principle known to the state of the art, which as illustrated in the present case with the aid of cutting inserts, can continue with a nose-like part 122 of the cutting insert whose rear surface 123 serves at the same time as a stopping surface for the frontal side 102 of the clamping arm 101.

Figures 1, 2, 3:
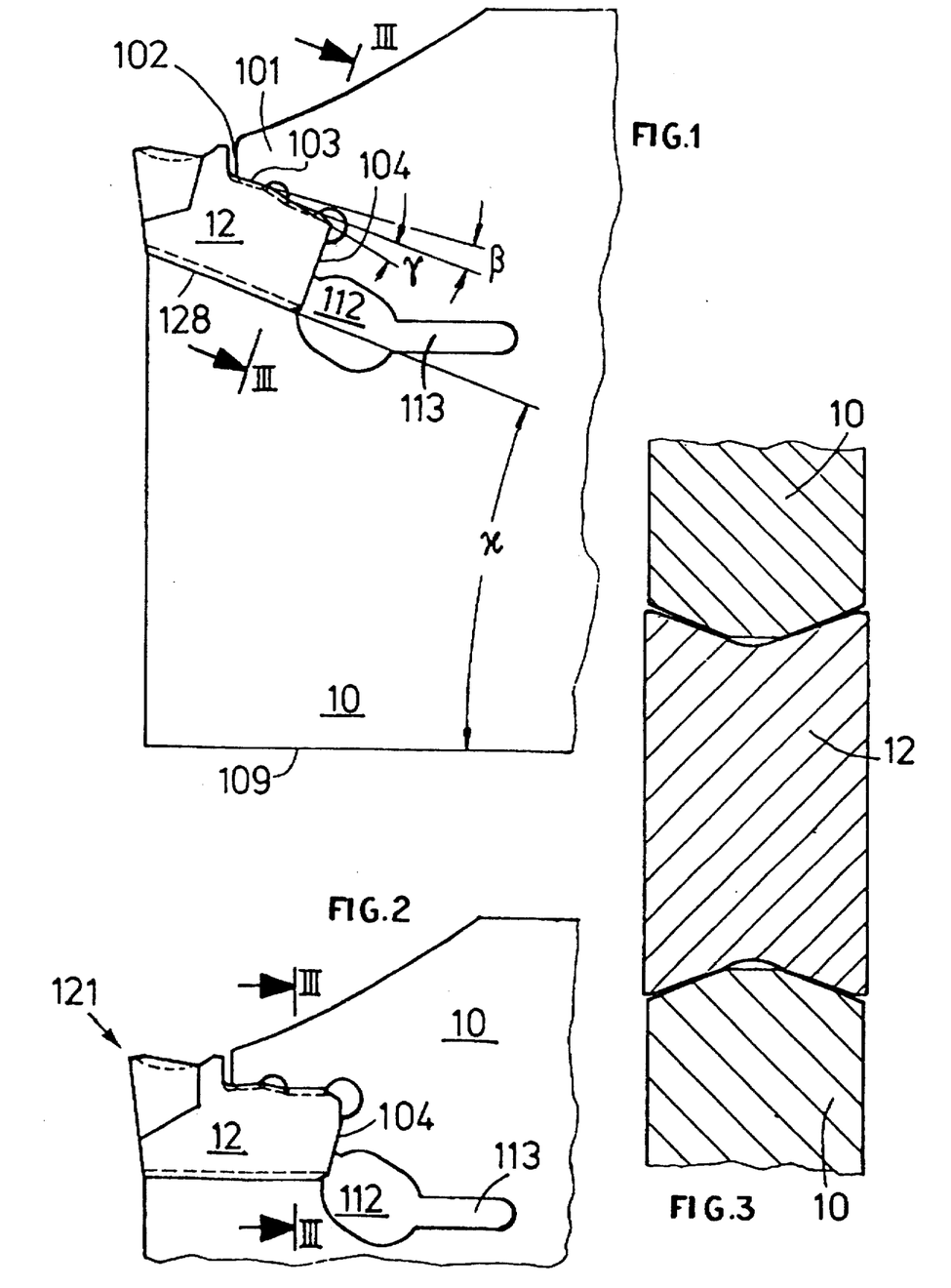
FIGS. 1 and 2 are a side view of lancing tool.
FIG. 3 is a section along line III—III according to FIG. 2.

As shown in the cross-sectional view corresponding to FIG. 3, the cutting insert is V-shaped in each of its upper and lower areas, whereby in the present case the cutting body 12 has an upwardly concave upper side and a downwardly concave lower side, opposed by the correspondingly designed shape of holder 10 whose upper side 10 is downwardly convex and whose lower side is upwardly convex.

Figure 5:
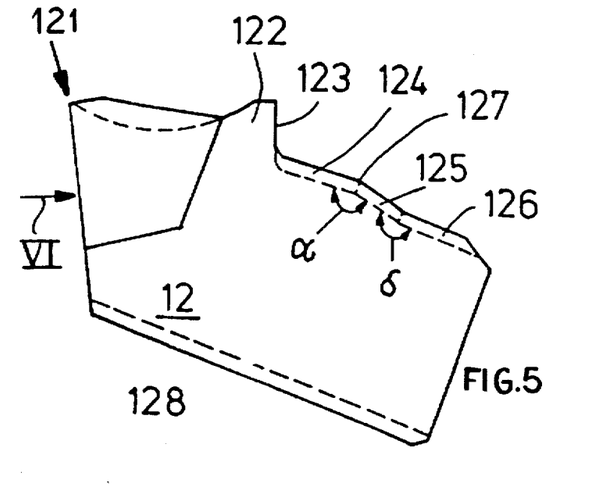
FIG. 5 is a side view of a cutting insert.
Figure 6:
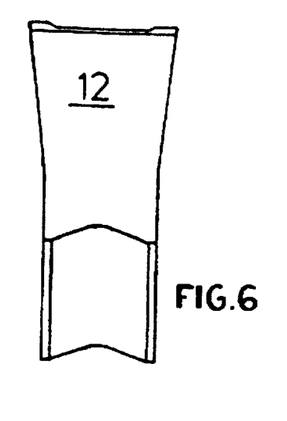
FIG. 6 is a frontal view of the cutting insert according to FIG. 5.

An essential feature of the cutting insert is the configuration of the upper side of the cutting insert in its rearward succession to nose 122. Here the cutting insert has three subsequent partial surfaces 124, 125 and 126, wherefrom the first two partial surfaces 124 and 125 form with each other an obtuse angle α (FIG. 5), and namely in such a manner that a salient or ridge point 127 is created. The angle δ between the partial surfaces 125 and 126 is equal to or greater than 180°, i.e. these partial surfaces form together a trough or a continuous flat surface.

The partial surface 126 can be parallel to the lower bearing surface 128 of the cutting insert or can run at a positive acute angle thereto. The partial surface 124 which is immediately bordering on nose 122 is inclined at a negative angle β (FIG. 1) with respect to the contact surface or to the plane defined by the contact lines of the cutting insert. This inclination angle β ranges between 2° and 10°, in the present case it equals approximately 5°.

The surface 125 is inclined at a positive angle γ with respect to the contact surface 128, whereby this angle can range between 5° and 70°, in the present case it equals 12°.

Figure 4:
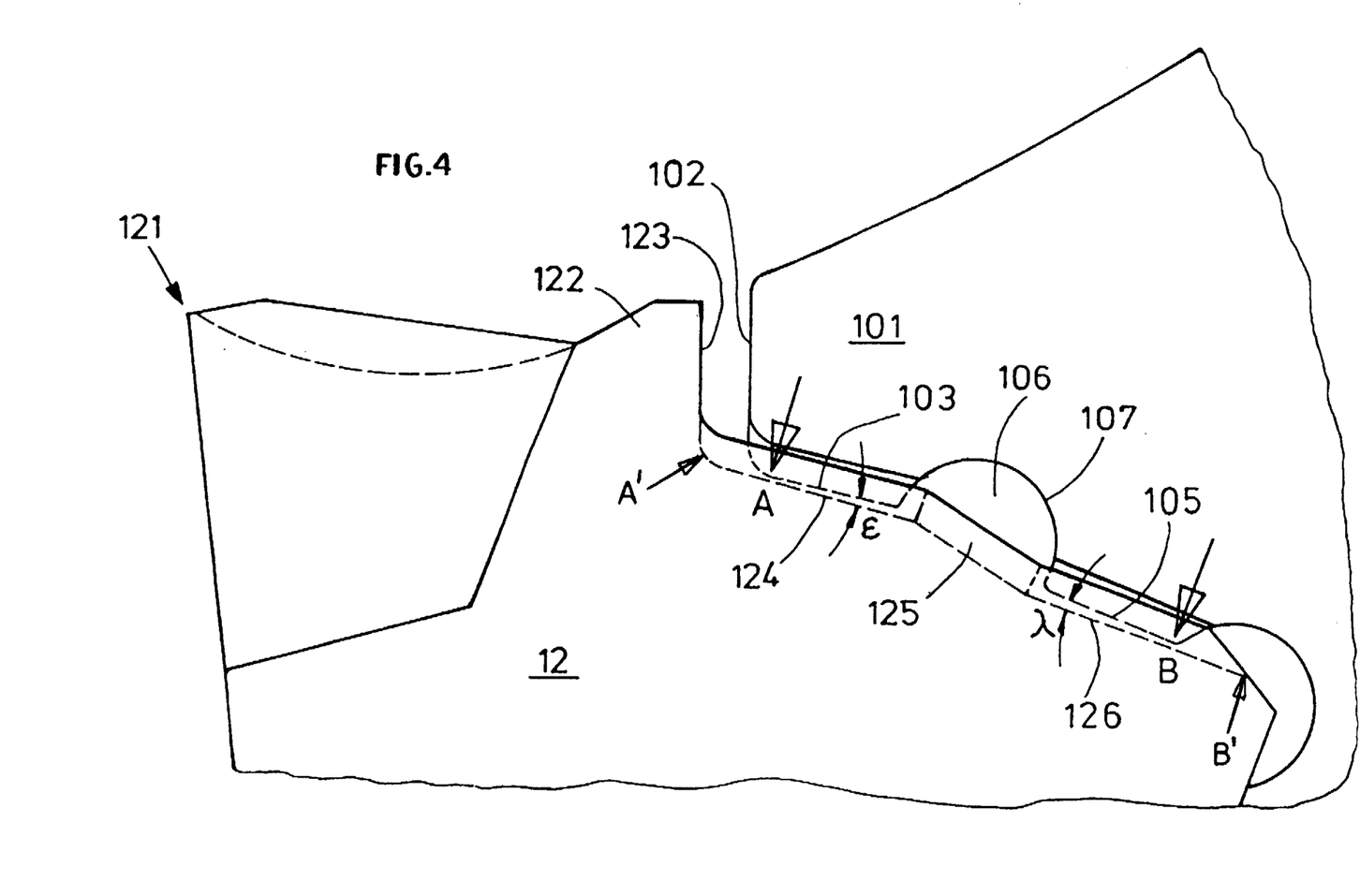
FIG. 4 is the enlargement of a detail of the insert according to FIG. 1 or 2.

The clamping arm has at least one frontal bearing surface 103, which when it does not fully rest against the partial surface 124, it rests against it clampingly at an angle Σ (see FIG. 4). Due to this angle Σ a punctiform or linear contact is created in the area of the bearing point marked A.

Due to the angle inclination β, the cutting insert 12 has also a rearward acting clamping force component, which prevents the cutting insert from being pulled out of the holder when the lancing tool is pulled out from a finished groove or during work with a duplicating or profile lathe with rearward acting cutting forces.

Figure 8:
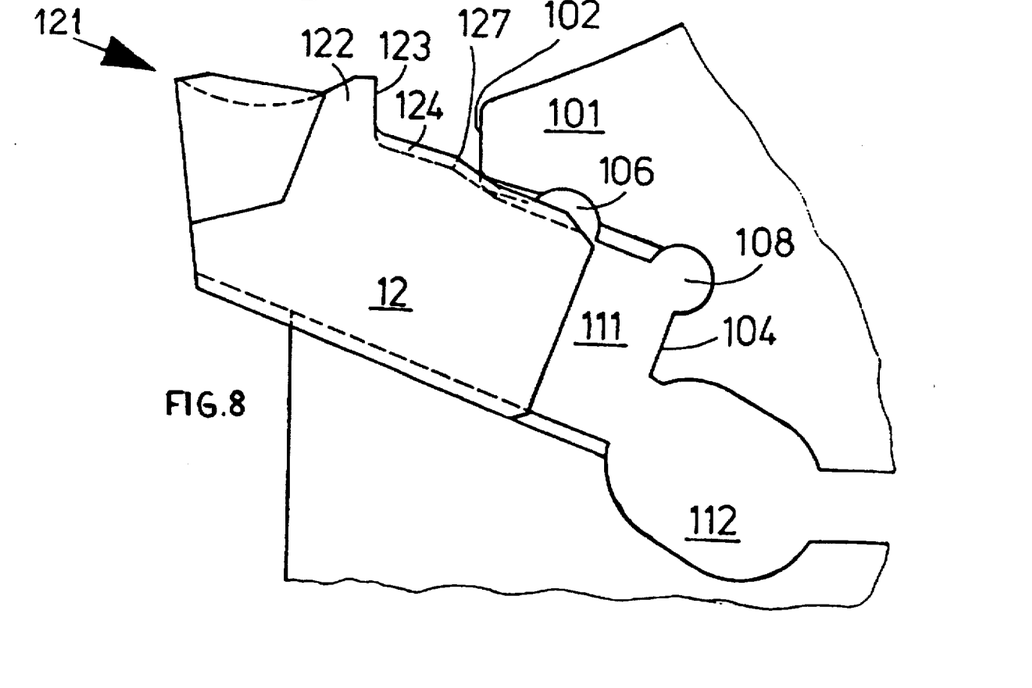
FIG. 8 is the insertion of a cutting insert according to FIG. 5 in a lancing tool holder.
Figure 9:
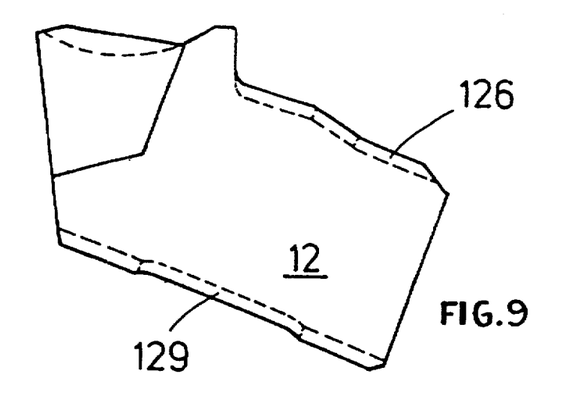
FIG. 9 is a lancing insert according to another embodiment.

The partial surface 125 succeeding the first partial surface 124 supports the expansion of the clamping arm 101 during the insertion of the cutting insert (see FIG. 8) into the recess 11, until the salient point 127 is reached, where the expansion reaches its maximum. A further insertion of the cutting insert 12 into the slot-shaped recess 11 is supported by the inclination of the partial surface 124 combined with the pressure stress of the clamping arm 101. The cutting insert can be pushed into slot-shaped recess 11 only so far until the frontal surface 102 of the clamping arm hits the arresting nose 122. At the same time or as an alternative thereto it is possible to provide also an arresting element 104 on the clamping arm 101 as a rearward limitation of the hollow space 111.

However the clamping arm 101 can also have a second clamping contact surface in the area B (see FIG. 4), when the clamping arm has a further surface 105 corresponding with the partial surface 126, which is also slightly inclined with respect to the partial surface 126 by an angle λ with an angle value of 1° to 10°, preferably 1° to 5°, so that here too in the area B a punctiform or linear contact in the rear portion of the cutting edge results.

In order to pass over the partial surface 125, the clamping arm 101 has in this area a recess 106 which has a semicircular profile 107. The clamping arm 101 bends in its clamped state. By selecting an optimal size for the recess 106 it can be achieved that the stress forces in the clamping areas A and B set themselves in such a way that during each work task a minimal displacement results at the cutting edge.

Figures 7, 7A:
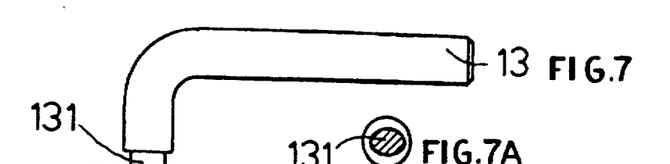
FIG. 7 is a side view of a socket wrench.
FIG. 7a is a sectional view according to line VII—VII in FIG. 7.

It is possible also to provide a further recess 108 defined with a circular profile in succession to the second clamping surface 105. The cutting insert 12 can be either rammed into the slot-shaped recess 11 with a striking tool, such as a rubber hammer, or after a corresponding expansion of the slot has been performed by means of the socket wrench 13 and a rotation of these wrench by 90°. The cutting insert can also be correspondingly removed after the widening of the slot 11 by means of the socket wrench 13.

The cutting insert can be rectilinear at its underside when seen in a side view, as is the case for instance in FIGS. 1, 2, 5 and 8. However as an alternative the cutting insert in a V-shaped prism can also have at its underside a hollow-bottom profile 129, which correspondingly applies to the recess 114 of holder 10 in the frontal receiving seat of slot 11.

As indicated in FIG. 1 it is also possible to arrange the contact surface 128 at an angle χ with respect to the holder underside 109 or parallel thereto.

Figure 11:
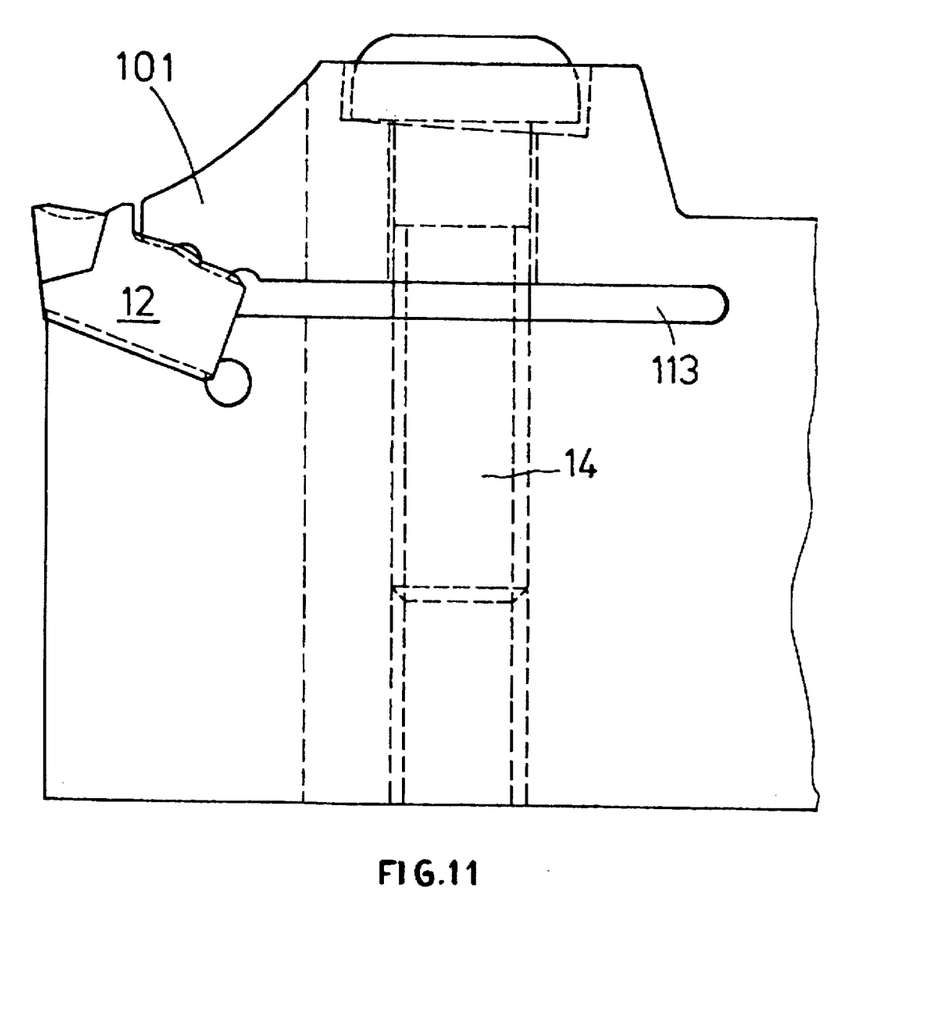
FIG. 11 is a lancing tool holder with clamping screw.

According to the embodiment shown in FIG. 11, which is particularly appropriate for longitudinal lathe turning, the clamping arm 101 is stressed by means of a clamping screw.

Figure 12:
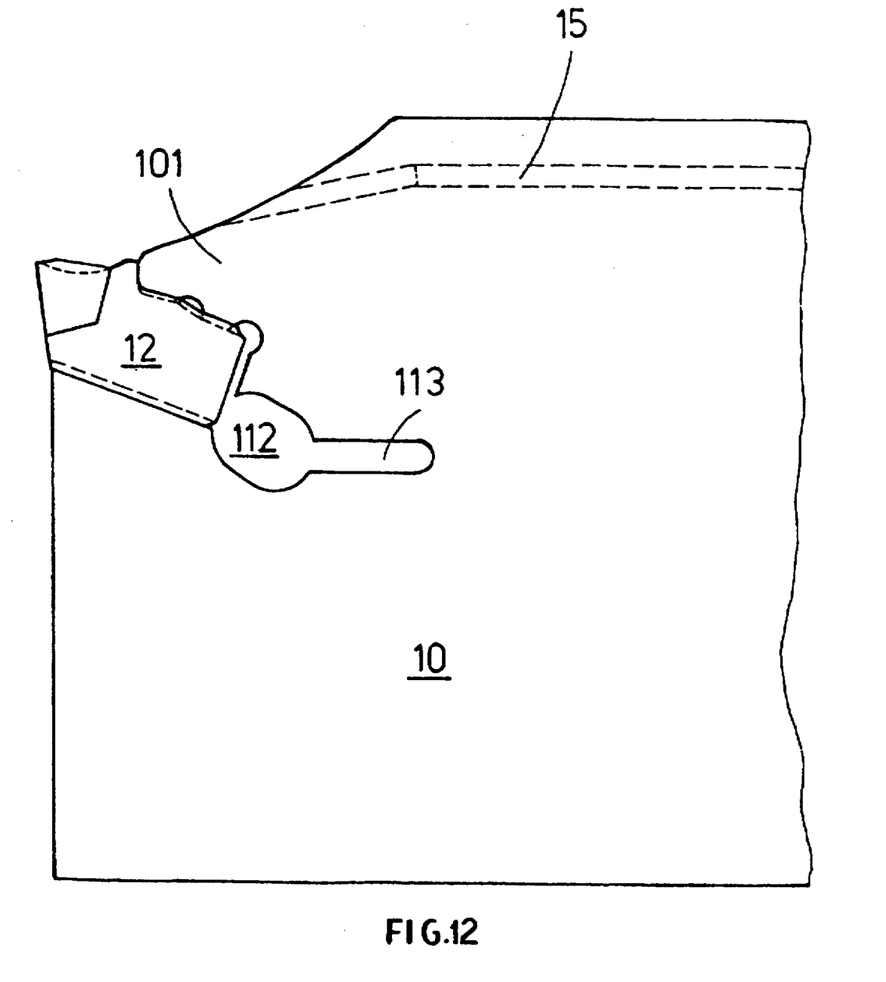
FIG. 12 is a lancing tool holder with cooling-medium supply line in the clamping arm.
Figure 13:
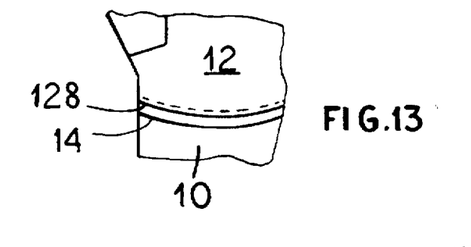
FIG. 13 is a side view of lancing tool with the concavely curved surface of the holder.

If a cooling and lubricating medium is required, such as for instance in machining operations using a lancing tool, the clamping arm 101 can also be additionally equipped with a cooling-medium supply channel 15 (FIG. 12).

We claim:

1. A metal removing tool comprising:

a tool body provided with a slot-shaped recess, said recess being formed with a wide mouth open at an edge of said body and defined between opposite sides of V-shaped cross section, and a narrow bottom extending inwardly from said mouth, said sides forming upper and lower flanks extending inwardly from said mouth and opposite one another, said lower flank being a bearing surface, said upper flank being formed with an outer face extending inwardly from said mouth and having a leading end, and an inner face lying inwardly and spaced apart from said outer face at a first obtuse angle to said first face and having a trailing end, said outer and inner faces of said body being bridged by a downwardly convex face; and a cutting insert detachably mounted in said recess and having opposite sides of a V-shaped cross section complementary to said cross section of said sides of said recess, said insert having a cutting edge projecting outwardly beyond said mouth, a lower surface extending parallel to and engaging said bearing surface of said body in an inserted position of said insert, and an upper surface which includes a first insert surface extending inwardly from said cutting edge extending at a first angle with respect to said outer face of said flank in the inserted position, said first insert surface being formed with a stop adjacent the cutting edge of said insert, said stop extending upwardly from said mouth in said inserted position of said insert and pressing against a frontal surface of the body, a second insert surface extending inwardly of said first surface and at a second obtuse angle thereto and forming a ridge therewith, said first insert surface forming a discrete first contact point between said leading end of said outer face of said body and said insert in said inserted position located between said ridge and said mouth so that said body is pressed against said insert at said first contact point, and a third insert surface extending inwardly from said second surface and at a third obtuse angle thereto and having at least one discrete second contact point with said trailing end of said inner face of said upper flank inclined at a positive angle with respect to said third insert surface in said inserted position, so that said insert is held under preliminary stress upon inserting.

2. The removing tool defined in claim 1 wherein said third insert surface extends at a negative angle β with respect to said lower surface of said insert, said negative angle β ranging between 2° and 30°.

3. The tool defined in claim 1 wherein said outer face rises inwardly with respect to the first surface of said cutting insert in said inserted position at an angle of ascent Σ ranging between 1° and 10°.

4. The tool defined in claim 1 wherein said lower surface of said insert is concavely curved downwardly.

5. The tool defined in claim 1 wherein said third insert surface of said insert is parallel to said lower surface of said insert.

6. The tool defined in claim 1 wherein said second insert surface is inclined at a positive angle of 5° to 70° with respect to the lower surface.

7. The tool defined in claim 1 wherein said inner face is inclined at a positive angle ranging from 0° to 10° with respect to the third insert surface of the cutting insert.

8. The tool defined in claim 1 wherein said body is formed with a cooling-medium channel.

9. The tool defined in claim 1 wherein said bottom of said recess is a narrow socket extending outwardly toward a seat of said insert and opening into a contoured recess located adjacent said seat of the insert in said inserted portion thereof, said socket having a cross section whose length exceeds its width.

10. The tool defined in claim 9 wherein the contoured recess and the socket have an oval cross section.

* * * * *